3,346,535
CARBON GRAFT POLYMERS
Henri G. G. Dekking, Fullerton, Calif., assignor to Union Oil Company of California, Los Angeles, Calif., a corporation of California
No Drawing. Filed Mar. 9, 1964, Ser. No. 350,538
9 Claims. (Cl. 260—41.5)

ABSTRACT OF THE DISCLOSURE

The invention comprises synthetic polymers grafted to carbon with a single ion exchange group terminally positioned on the polymer chain. The compositions are prepared by reacting carbons having at least about 1 milliequivalent per 100 grams of base exchange capacity with a basic nitrogen cationic organic polymer initiator under base exchange conditions. The initiator can be a cationic organic azo compound which is base exchanged onto the surface of the carbon and which decomposes in the presence of the monomer to yield free radicals bound by ion exchange to the carbon which initiate vinyl polymerization of the monomer. The polymer thus propagates from the surface of the carbon and yields a polymer grafted at a single terminal point to carbon.

This invention relates to carbon graft polymers wherein synthetic polymers are grafted to carbon and to a method for the propagation of graft polymers from the surface of carbon.

Carbon and carbonaceous solids are frequently employed in the loading or filling of various plastic and resinous compositions, e.g., carbon black is frequently employed as a filler in rubber compositions. For such use, it is desirable that the carbon be chemically combined with polymer so as to achieve maximum compatibility of these materials and thereby insure maximum strength and solvent resistance. Additionally, it is often desirable to provide a carbon having an organic coating or surface that contains unsaturated bonds which are available for crosslinking to other unsaturated bonds of a synthetic polymer, e.g., in vulcanization of synthetic rubber.

It is known that the surface of various carbons such as graphite, carbon black, etc., are reactive under certain conditions and can be treated with an organic material to render the carbon hydrophobic. Examples of such treatment comprise the alkylation or arylation of carbon black with Friedel-Crafts catalysts such as described in U.S. 3,025,259 and 3,043,708. Another method comprises the oxidation of graphite to form graphitic acid and reaction of such graphitic acid with alkyl onium compounds to form alkyl onium salts in the method described in U.S. 3,084,172.

While the aforedescribed methods accomplish the purpose of imparting organophilic properties to carbon, the amount of organic material that can be chemically combined in such manner is limited. Typically, the amount of organic material that can be alkylated or arylated onto carbon black is less than about 10 weight percent and often less than 1 weight percent. Additionally, as stated in 3,084,172, the surface of graphitic acid or oxide rapidly becomes covered with the alkyl onium compound, thereby limiting the extent of hydrocarbon that can be base-exchanged onto graphite. The molecular weight of the alkyl and aryl groups added to graphite or carbon black in either of the aforedescribed methods is also limited to less than about 25 carbons, the commercially available fatty acid groups or hydrocarbons, and this also limits the amount of organic material that can be added.

It is an object of my invention to prescribe a method for the grafting of synthetic polymers to carbons.

It is also an object of my invention to provide a method for the propagation of a polymer chain from the surface of carbon.

It is an additional object of my invention to prescribe a method whereby large amounts of an organic polymer can be chemically combined with carbon.

Other and related objects of my invention will be apparent from the following description.

I have now found that organic polymers can be grafted to carbon by utilizing the ion exchange sites present on carbon. Various synthetic vinyl polymers bearing a cationic radical can be readily grafted to carbon by use of such cationic sites present in the naturally occurring carbon or added thereto by a suitable oxidizing treatment. The carbon graft polymers of my invention thus comprise a synthetic vinyl polymer bearing a terminally positioned cationic radical which is attached, through an ionic bond, to a carboxylic acid radical of the carbon. Such graft polymers can be prepared by reacting, under base exchange conditions, a cationic vinyl polymer with the carbon.

In a preferred embodiment of my invention, I have discovered that synthetic vinyl polymers can be readily graft propagated from the carbon by base exchanging a polymerization initiator, hereinafter described, onto the carbon to obtain a carbon-initiator complex and thereafter initiating polymerization of a vinyl monomer with such carbon-initiator adduct.

The base exchange reaction occurring between carbon and an organic addent is as follows:

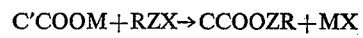

wherein:

C′ represents carbon bearing a carboxylic acid group;
M represents the cation, frequently a hydrogen ion, associated with the carboxyl group on the carbon;
R represents the organic addent, i.e., the cationic synthetic polymer or cationic polymerization initiator to be base exchanged onto carbon;
Z represents the cation radical of said organic addent; and
X represents the anion of the cationic polymer or cationic initiator.

The aforedescribed reaction is preformed under base exchange conditions. Such conditions are achieved by contacting the carbon with an aqueous solution or suspension of the cationic addent at ambient temperature, e.g., 0° to 100° C., preferably 20° to 35° C., due care being exercised to avoid any temperatures that could decompose any of the reactants or cause any other undesired reaction. The cationic addent can have any suitable anion associated therewith such as a halide, e.g., chloride, bromide, fluoride, iodide, sulfate; nitrate; hydroxide; phosphate; etc. Preferably, the particular anion will form a water soluble compound with the cation of carbon, M, so that the graft copolymer can be freed of contaminants by water washing. Accordingly, I prefer to use the halide and hydroxide anions; most preferably, the chloride.

Carbon from various sources can be treated in accordance with my invention and in this respect, my invention has a greater application than the aforedescribed methods requiring the use of carbon black or highly reactive graphic acid. Generally, most carbons such as coke, carbon black, graphite, etc., have carboxylic acid groups associated therewith, imparting a base exchange capacity of at least about 1 milliequivalent per 100 grams to the carbon. Frequently, the base exchange capacity is considerably higher, between about 10 and about 50 milliequivalents per 100 grams.

The carbon can also be processed by treatment with an oxidizing agent such as oxygen, ozone, peroxides, permanganates, nitrates, nitric acid, sulfuric acid, etc., so as to increase the number of base exchange sites on the carbon. Typically such sites comprise carboxylic acid groups formed by the oxidizing treatment, however, it is of course apparent that sulfonation of the carbon by treatment with concentrated or fuming sulfuric acid will add sulfonic acid groups thereto which can also function as cation exchange sites.

The carbon can be subjected to a mild oxidation, particularly in the manner described in U.S. 2,798,878 for the preparation of graphitic acid from graphite. In this treatment the carbon is preferably graphite and is treated with a concentrated sulfuric acid containing a nitrate and permanganate salt at a temperature of about 35° C. for about 30 minutes. By such treatment, graphite can be converted to graphitic acid having from about 75 to about 400 milliequivalents base exchange capacity per 100 grams.

Organic polymers containing a base exchangeable cation can be derived from polymers having a terminal basic nitrogen group. Such polymers, in turn, can be prepared by several methods, e.g., anionic chain homo- or copolymerization of vinyl monomers can be used to obtain an amine terminated vinyl polymer.

Such polymerization is initiated by an amide ion that becomes an integral part of the polymer. The polymerization is performed in liquid ammonia and is initiated by the addition of an alkali metal amide to the reaction medium or by the addition of an alkali metal amide to the reaction medium or by the addition of an alkali metal such as sodium, potassium, cesium, etc., with a suitable catalyst to form the amide ion in situ. Any of the following monomers can be polymerized or copolymerized in this manner to produce amine terminated polymer and copolymer chains: styrene, acrylonitrile and methacrylonitrile. Various copolymers such as styrene-acrylonitrile copolymer, styrene-methacrylonitrile copolymer, acrylonitrile-methacrylonitrile copolymer, etc. can also be obtained in this manner. The polymerization is performed in ammonia at atmospheric or superatmospheric pressure so as to maintain the ammonia in a liquid phase. Generally between about 1 and 200 atmospheres are employed and the polymerization is performed at temperatures between about −75° and about 120° C., lower temperatures tending to favor the highest molecular weight polymers. The resultant polymers contain the initiating amide ion at the end of the polymer chain and this amide ion can be readily converted to an ammonium salt for base exchange with carbon in the manner hereinafter described.

Synthetic polymers terminated with a basic nitrogen that can serve as a cation group can also be obtained from the polymerization of a variety of vinyl monomers with cationic initiators such as cationic azo compounds having the following structure:

$$R_1-N=N-R_2$$

wherein at least one and preferably both $R_1$ and $R_2$ contain a cationic group, preferably a basic nitrogen group; and $R_1$ and $R_2$ are selected from the class consisting of aryl, alkaryl, aminoaryl, amidinylaryl, aminoalkaryl, amidinylalkaryl, alkyl, amidinylalkyl, aminoalkyl, aralkyl, amidinylaralkyl and aminoaralkyl.

Preferably, the cationic azo compounds have secondary or tertiary carbons vicinal to the azo nitrogen. Representative of this class of bi-functional azo compounds are the following:

Where $R_1$ is aryl or alkaryl and $R_2$ is aminoalkyl, amidinylalkyl, aminoaralkyl or amidinylaralkyl: phenylazomethylamine, phenylazopropylamine, 2-napthylazomethylamine, p-tolylazobutyramidine, p-tolylazoisopropylamidine, p-tolylazopentylamidine, α-(phenylazo)-β-aminocumene, α-(tolylazo)-β-aminocumene, α-(phenylazo)-p-aminotoluene, etc.

Where $R_1$ is aryl or alkaryl and $R_2$ is aminoaryl, amidinylaryl, aminoalkaryl, or amidinylalkaryl: 4-aminoazobenzene, 3-aminoazobenzene, N,N′-dimethyl 4-aminoazobenzene, 1-amino 2,2′-azonaphthalene, etc.

Where $R_1$ is alkyl or aralkyl and $R_2$ is aminoalkyl, amidinylalkyl, aminoaralkyl or amidinylaralkyl: aminodiazomethane, methylazobutyramidine, 2-methylazoisopropylamine, α-ethylazo β-aminocumene, α-methylazophenethylamine, etc.

Where $R_1$ is alkyl or aralkyl and $R_2$ is aminoaryl, amidinylaryl, aminoalkaryl or amidinylalkaryl: p-aminophenylazomethane, o-aminoxylyazoisopropane, 6-amino 2-naphthylazoethane, 2(p-aminophenyl) 1-phenylethane, etc.

Where $R_1$ and $R_2$ contain amino or amidinyl groups: 4,4′-diaminoazobenzene, 3,3′-dimethyl 4,4′-diaminoazobenzene, 6(p-aminophenylazo) 2-naphthylamine, 2,2′-azobisisobutylramidine, α,α′-azobis (p-quanyltoluene), azobisisopropylamine, azobismethylamidine, etc.

In another embodiment, $R_1$ and $R_2$ can be a single alkylene group, thereby forming a heterocyclic azo compound. These heterocyclic initiators are represented by the following:

wherein:

R is selected from the class consisting of alkylene, alkylalkylene, arylalkylene;
X is a basic nitrogen group; and the total carbons in said compound is between about 2 and 20.

Preferably, these heterocyclic azo compounds have secondary or tertiary carbons vicinal to the azo nitrogen. Representative of the aforementioned azo compounds are:

3,5-diamidinyl-1,2-diaza-1-cyclopentene,
3-methyl-3,4-diamidinyl-1,2-diaza-1-cyclopentene,
3-ethyl-3,5-diamidinyl-1,2-diaza-1-cyclopentene,
3,5-dimethyl-3,5-diamidinyl-1,2-diaza-1-cyclopentene,
3,6-diamidinyl-1,2-diaza-1-cyclohexene,
3-propyl-3,6-diamidinyl-1,2-diaza-1-cyclohexene,
3-isopropyl-3,6-diamidinyl-1,2-diaza-1-cyclohexene,
3-amyl-6-methyl-3,6-diamidinyl-1,2-diaza-1-cyclohexene,
3-phenyl-3,5-diamidinyl-1,2-diaza-1-cyclopentene,
3,5-diphenyl-3,5-diamidinyl-1,2-diaza-1-cyclopentene,
3-methyl-5-phenyl-3,5-diamidinyl-1,2-diaza-1-cyclopentene,
3-phenyl-3,6-diamidinyl-1,2-diaza-1-cyclohexene,
3,6-diphenyl-3,6-diamidinyl-1,2-diaza-1-cyclohexene,
3-(p-aminophenyl)-1,2-diaza-1-cyclopentene,
3,5-di(aminomethyl)-1,2-diaza-1-cyclopentene,
3-aminoisopropyl-1,2-diaza-1-cyclohexene,
3-ethyl-6-(o-aminophenyl)-1,2-diaza-1-cyclohexene,
3,8-diamidinyl-1,2-diaza-1-cyclooctene,
5-(p-aminophenyl)-1,2-diaza-1-cyclodecene, etc.

The aforementioned cyclic azo compounds can be readily obtained from the corresponding diketone compound by reacting, in a first step, the diketone with hydrogen cyanide and hydrazine at temperatures between about 0° and 100° C. and pressure sufficient to maintain liquid phase conditions. The ensuing reaction forms a heterocyclic hydrazine which can be oxidized with bromine to yield the heterocyclic compound containing the azo linkage that bridges the original keto-carbons to form the ring and which also contains an appendant nitrile group from each of the former keto-carbons of the parent compound. The dinitrileazocyclo compound can thereafter be converted to an amidinyl compound by treating with an alcoholic solution of a halogen acid, e.g., hydrogen chloride in ethanol at from about 0° to 15° C. and thereafter contacting with ammonia at a temperature between about 0° and 20° C. to convert the nitrile groups to amidinyl groups.

Any of the vinyl compounds that are readily polymerized by initiation with a free radical can be polymerized by the aforementioned azo compounds. As used herein, vinyl compounds include all ethylenically unsaturated monomers that can be polymerized through aliphatic unsaturation by free radical initiation. The term vinyl thus includes vinyl, vinylene and vinylidene compounds. While it is preferred to employ at least one monoolefinic monomer to obtain a substantially linear polymer, the copolymerization of such a monomer with a diolefin, e.g., butadiene, and even the homopolymerization of butadiene is within the scope of my invention. In general, such vinyl monomers include the following:

Hydrocarbon olefins and diolefins such as ethylene, propylene, butene-1, isobutylene, butadiene, pentene-1, isopentene, pentadiene, isoprene, hexene, isohexene, isoheptene, heptadiene, octene, isooctene, nonene, decene, styrene, methylstyrene, vinyl naphthalene, etc.;

Vinyl halides such as vinyl fluoride, vinyl chloride, vinylidene chloride, fluorotrichloroethylene, chlorostyrene, chloroprene, etc.;

Acrylics such as acrylic acid, methacrylic acid, acrylamide, methacrylamide, acrylonitrile, methacrylonitrile, methyl methacrylate, methyl acrylate, ethyl acrylate, ethyl methacrylate, propyl acrylate, iso-propyl methacrylate, iso-butyl acrylate, amyl methacrylate, hexyl methacrylate, lauryl methacrylate, stearyl methacrylate, etc.;

Vinyl ethers such as ethyl vinyl ether, iso-propyl vinyl ether, butyl vinyl ether, etc.;

Vinyl esters such as vinyl acetate, vinyl propionate, vinyl isobutyrate, vinyl benzoate, diallyl phthalate, divinyl terephthalate, vinyl naphthoate, etc.; and Miscellaneous vinyl compounds such as vinyl pyridine, vinyl carbazole, vinyl pyrrolidone, etc.

Any of the aforementioned monomers or mixtures thereof can be polymerized or copolymerized with the free radicals prepared in accordance with my invention using otherwise conventional techniques in the art. Thus, emulsion, bulk or solution polymerization can be employed.

As previously mentioned, the preferred embodiment of my invention comprises base exchanging a suitable polymerization initiator onto the carbon and thereafter employing the carbon-initiator complex to initiate polymerization of a suitable vinyl monomer and thereby graft propagate a polymer chain from the carbon. In this embodiment, any of the aforementioned polymerization initiators having one or more cationic groups can be employed.

In such preferred embodiment, the use of any of the aforementioned heterocyclic azo initiators offers an advantage in that use of the cyclic initiator reduces the amount of homopolymer formed since decomposition of the cyclic initiator merely opens the ring and provides a single fragment bearing a free radical at each end. The decomposition of any of the aforementioned acyclic azo compounds divides such compound and yields two fragments each bearing a free radical that is capable of initiating polymerization. Even when both ends of such acyclic azo compounds contain a cationic group some homopolymer can form during polymerization because, statistically, not every initiator will be bonded to carbon at both cationic groups.

In either embodiment, the organic addent, i.e., the cationic synthetic polymer or the cationic polymerization initiator are combined with the carbon by a suitable base exchange step. The synthetic organic adduct, be it the cationic polymerization initiator or the cationic polymer, can be obtained from the aforementioned organic compounds or polymers having a basic nitrogen group by treatment of the compound or polymer to convert the basic nitrogen to an ammonium, amidinium or quaternary salt. This can be accomplished by dissolving the compound or polymer in a suitable inert solvent such as benzene, chloroform, methylethyl ketone, dichlorobenzene, formamide, dimethyl formamide, acetone, hexane, trichloroethane, cyclohexane, isopropylacetate, ethyl propionate, toluene, amyl bromide, xylene, n-butyl ether, etc., and thereafter adding a dilute acid to form the cationic group, e.g., the ammonium or amidinium salt of the organic addent. Suitable acids are hydrochloric, acetic, phosphoric, sulfuric, nitric, etc. If desired, a quaternary salt can be formed by adding organic esters of mineral acids instead of the aforementioned acids. Examples of such esters are:

Methyl sulfate, triethyl phosphate, ethyl nitrate, etc. or by the addition of alkyl halides such as methyl chloride, ethyl fluoride, etc.

By any of these methods, the basic nitrogen of the organic compound is converted to its highest positive valency which, upon addition of water, gives rise to an organic cation. This is suitably accomplished by the addition of about 0.1 to 10 parts of water to each part of the organic solution.

The solvent-water dispersion of organic cations is thereafter added to a dispersion of the carbon, whereupon the carbon-graft polymer or the carbon-initiator complex is formed by conventional base exchange of the organic cation for the cation present on the carbon. If desired, it is of course apparent that the several steps described above can be simultaneously performed by addition of the dilute acid, water and carbon suspension to an organic solution of the organic addent or simply by the addition of the organic addent to an acidified aqueous suspension of the carbon.

When the organic addent employed in the base exchange step is the cationic terminated synthetic polymer, the carbon graft polymer can be separated from the aqueous solution used in its preparation by any suitable solid-liquid separation technique, e.g., filtration, and thereafter dried. When the organic addent comprises the cationic polymerization initiator as in the preferred embodiment of my invention, the carbon graft polymer can be derived therefrom by adding the vinyl monomer to the suspension and heating the resultant suspension to a suitable activation temperature, e.g., between about 35° and 150° C. to initiate the polymerization. If desired, however, the carbon-initiator complex can be separated from the aqueous solution employed in its preparation and the resultant solid product can be stored, handled and subsequently employed in a polymerization to obtain the desired products.

The carbon containing adduct, i.e., graft polymer or carbon-initiator complex is a very stable product. The ionic bonding of the organic cation to the carbon is stable because the cation is very large, e.g., a polystyrene macromolecule. Accordingly, such a molecule will not readily base exchange from the carbon and the adducts are resistant to organic solvents and aqueous solutions.

The carbon-initiator complex prepared in accordance with my invention can be employed for the initiation of polymerization of various vinyl monomers. As previously mentioned, emulsion, bulk or solution polymerization can be employed.

The initiators are well suited to bulk homo- or co-polymerization by the dispersion of between about 0.05 and about 10,000 parts by weight of the carbon-initiator complex in 100 parts by weight of the monomer; preferably between about 20 and about 2000 parts by weight per 100 parts of any of the aforementioned monomers is employed. The resultant dispersion is thereafter heated, preferably under nitrogen, to between about 25° and 125° C. to decompose the azo compound and initiate polymerization. This technique is well suited for the use of various carbon fillers, e.g., charcoal, coke, graphite, etc., in molding compositions.

Emulsion homo- or co-polymerization of the aforementioned monomers can also be performed with use of my carbon initiator complex. Examples of various monomers that can very readily be emulsion polymerized are butadiene, styrene, butadiene-styrene, vinyl acetate, vinyl chloride and acrylic acid esters such as methylmethacrylate, ethylacrylate, lauryl methacrylate, acrylonitrile, etc. In general, the emulsion is formed by the addition to the reactants of about 0.1 to about 5.0 percent (based on the amount of the monomer) of a non-ionic emulsifying agent, e.g., condensates of ethylene oxide with alkylphenols, fatty acids, fatty alcohols, and fatty amides which preferably have hydrophobic groups containing between about 10 and about 24 carbons and between about 14 and 15 ethylene oxide units. Emulsions containing from 5 to about 300 parts by weight of the monomer in 100 parts water can be used, preferably, the monomer is used in an amount between about 10 and about 200 parts per 100 parts of water. The carbon-initiator complex is used in amounts between about 0.05 and about 10,000 parts per 100 parts of monomer; preferably in amounts between about 0.2 and about 200 parts per 100 parts water.

Solution polymerization of the aforementioned monomers or copolymerization of mixtures of the monomers can also be conducted in various solvents such as benzene, cyclohexane, n-hexane, ethylbenzene, trichlorobenzene, dimethyl formamide, pentane, heptane, acetone, methanol, etc. The monomer or mixture of monomers is added to the solvent, generally in an amount between about 5 and about 300 parts per 100 parts of solvent, preferably between about 10 and about 200 parts per 100 parts. the carbon-initiator complex of my invention can readily be dispersed in any of the aforementioned solvents in the necessary amounts; between about 0.04 and about 500 parts per 100 parts of monomer, preferably between about 0.2 and about 200 parts per 100 parts of monomer are employed. Upon heating to the selected initiation temperature; between about 25° and about 80° C.; the azo nitrogen-carbon bonds of the carbon-initiator complex of my invention are homolytically cleaved and free radicals are generated which react with the monomer to initiate polymerization. In any of the aforedescribed polymerization techniques, carbon graft copolymers are obtained wherein the synthetic polymeric material is grafted to the carbon through a cationic group linkage, preferably through a basic nitrogen radical.

The following examples will illustrate my invention and demonstrate the results obtainable therewith:

*Example 1*

To 200 milliliters of distilled water was added 5 grams of carbon black and 0.3 gram of azobisisobutyramidine hydrochloride. The solids were filtered off, washed in 200 milliliters of distilled water and filtered again. The carbon black-azo complex was then dispersed in 200 milliliters of distilled water to which was added 10 grams of styrene and 3 milliliters of a nonionic emulsifying agent. The emulsion was agitated and heated under an inert gas, argon, for 3 hours at 65° C. Thereafter the emulsion was cooled and filtered. The solid so separated was washed in methanol, filtered and dried and an attempt to extract the polymer was made by mixing in benzene at atmospheric reflux temperature, but no polystyrene could be extracted therefrom. Analysis showed the solid to contain about 15 weight percent polystyrene and to be highly hydrophobic. The solid was highly organophilic.

*Example 2*

To 400 milliliters of distilled water was added 50 grams of acrylamide. The mixture was heated to 42° C., purged with nitrogen, and then 7 grams of isopropyl alcohol and 0.1 gram of azobisisobutyramidinium hydrochloride were added. The temperature of the mixture was held at 45°–50° C. for two hours and at the end of this period the mixture was a thick viscous solution. The solution was poured into methanol and polyacrylamide polymer was precipitated. The precipitate was recovered by filtration and dried. It had an average molecular weight of 516,600 and was water soluble.

To 100 milliliters of distilled water was added 1.0 gram of finely divided carbon black and 1.0 gram of the aforedescribed amidinium terminated polyacrylamide. The suspension was stirred for 2½ hours and then permitted to stand for about 16 hours. The suspension was then filtered and the filter cake was washed with water in repeated washings. The filter cake was then dried and weighed. The yield of carbon-graft polymer was 1.268 grams indicating that about 27 weight percent of polyacrylamide had been grafted to the carbon black.

The preceding examples are intended solely to illustrate a mode of practice of my invention and to demonstrate the results obtainable thereby. The invention is not to be unduly limited by these examples but is intended to be defined by the elements, and their equivalents, of the following composition claims and the steps, and their equivalents of the following method claims.

I claim:

1. A composition comprising carbon ionically bonded to a polymer through a basic nitrogen cationic radical terminally positioned on said linear polymer, said polymer being derived by the polymerization of at least an ethylenically unsaturated monomer through aliphatic unsaturation.

2. The composition of claim 1 wherein said carbon is carbon black.

3. The composition of claim 1 wherein said carbon is graphite.

4. The composition of claim 1 wherein said carbon is coke.

5. The composition of claim 1 wherein said polymer is polystyrene.

6. The composition of claim 1 wherein said polymer is a copolymer of butadiene and styrene.

7. The method for propagating a polymer from the surface of carbon that comprises reacting a cationic organic azo compound with carbon having a base exchange capacity of at least one milliequivalent per 100 grams under base exchange conditions so as to form an ionic bond between carboxylic acid radicals that occur on said carbon surface and the basic nitrogen cationic radical of said cationic organic azo compound, thereby forming a carbon-azo complex, mixing said carbon-azo complex with an ethylenically unsaturated monomer that undergoes free radical polymerization through aliphatic unsaturation and heating the mixture to decompose the azo radical of said complex by homolytic fission and thereby obtain free radicals which are ionically bonded to said carbon and which initiate polymerization of said monomer to propagate said polymer from said carbon.

8. The method of claim 7 wherein said organic azo compound is acyclic.

9. The method of claim 7 wherein the azo radical of said organic azo compound is contained in the ring of a heterocyclic compound.

References Cited

UNITED STATES PATENTS

| | | | |
|---|---|---|---|
| 3,008,949 | 11/1961 | Langer et al. | 260—41 |
| 3,256,236 | 6/1966 | Herman et al. | 260—41 |
| 3,272,786 | 9/1966 | Perry | 260—93.5 |

MORRIS LIEBMAN, *Primary Examiner.*

A. LIEBERMAN, *Assistant Examiner.*